Oct. 27, 1925.

G. T. NICHOLS

AUTOMOBILE WHEEL RIM

Filed March 10, 1924

WITNESSES
Howard D. Orr.
F. P. Smith

INVENTOR,
George T. Nichols,
BY
ATTORNEY

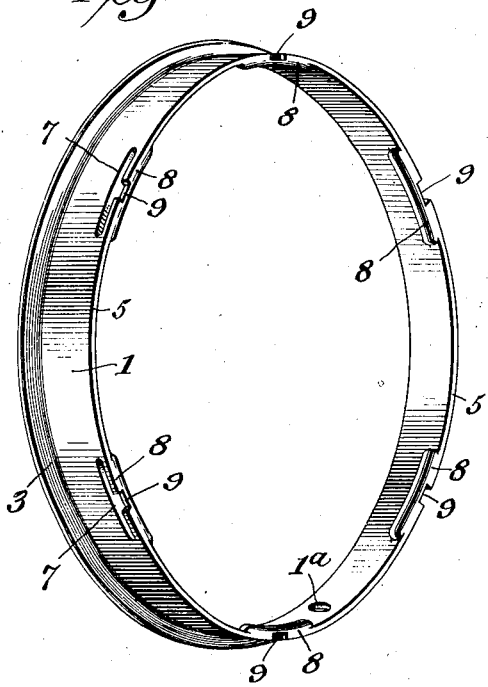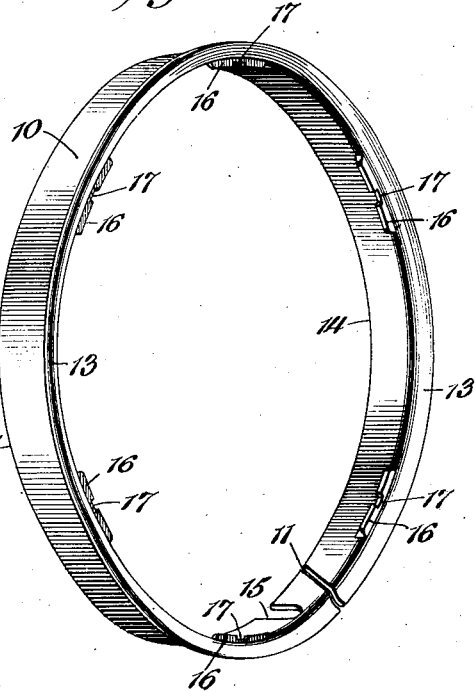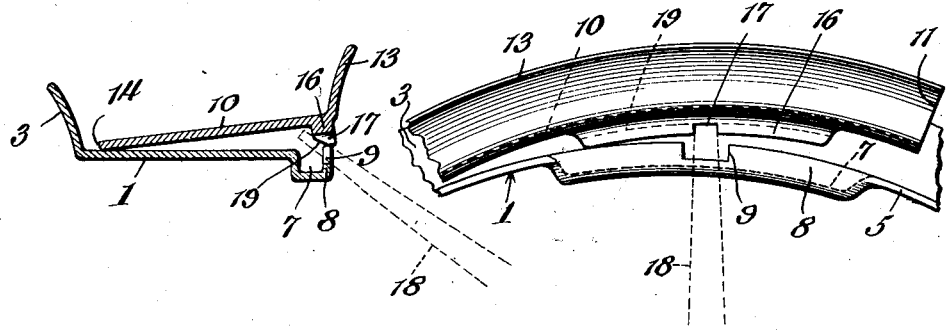

Patented Oct. 27, 1925.

1,558,908

UNITED STATES PATENT OFFICE.

GEORGE T. NICHOLS, OF GAINESVILLE, TEXAS.

AUTOMOBILE WHEEL RIM.

Application filed March 10, 1924. Serial No. 698,248.

*To all whom it may concern:*

Be it known that I, GEORGE T. NICHOLS, a citizen of the United States, residing at Gainesville, in the county of Cooke and State of Texas, have invented new and useful Improvements in Automobile Wheel Rims, of which the following is a specification.

This invention relates to automobile wheel rims, and is designed to improve and to simplify the construction of the wheel rim shown and described in Patent No. 1,423,354 issued to me July 18th, 1922.

The object is to provide an automobile wheel rim which will permit of the easy and quick mounting of a tire upon the wheel, or the demounting of the same therefrom, and to provide efficient means for the purpose comprising the minimum number of parts, which when properly interlocked in position on the wheel, serve to rigidly hold the tire thereon without danger of becoming accidentally loosened.

Another object is to provide an automobile wheel rim composed of parts which may be readily formed by stamping, thus eliminating the expensive finishing and machining processes generally necessary, and materially lowering the cost of production, the parts being only two in number, including the fastening means, and being readily applied and locked together at the factory, thus facilitating the shipment of the same, so as to occupy a minimum amount of space in transit and avoid the danger of losing any of the parts.

In carrying out the invention, I provide a wheel rim consisting of coacting members in the form of rings, one of which, the base ring, is carried by the wheel felly, the other or locking ring being normally free therefrom and independent of the tire, which permits the latter to be applied to the wheel having the base ring thereon, without interference by the locking ring, which is afterward applied and secured to said base ring to hold the tire securely in place on the wheel, the base ring having a plurality of sockets or seats, and the locking ring provided with a corresponding number of lugs to enter the sockets or seats, the operation of securing the locking ring in position requiring only the use of a simple prying tool, such as a screw driver, which may also serve to remove the locking ring when it is desired to demount the tire, the latter being readily removed from the wheel along with the locking ring, which may then be easily removed from the tire, thus overcoming a great difficulty encountered in the use of ordinary wheel rims.

A full and complete understanding of the invention may be obtained from a consideration of the following detailed description, taken in connection with the accompanying drawings forming a part of this specification; it being understood that while the drawings show a practical form of the invention, the latter is not confined to strict conformity with the showing thereof, but may be changed or modified, so long as such changes or modifications mark no material departure from the salient features of the invention, as specifically pointed out in the appended claims.

In the drawings, in which similar reference characters designate corresponding parts throughout the several figures:

Figure 4 is a detached perspective view of the base ring;

Figure 5 is a similar view of the locking ring;

Figure 6 is a detail transverse sectional view through the coacting rings and showing the manner of locking or unlocking the same; and Figure 7 is a detail side elevation of the subject matter of Figure 6.

Figure 2:
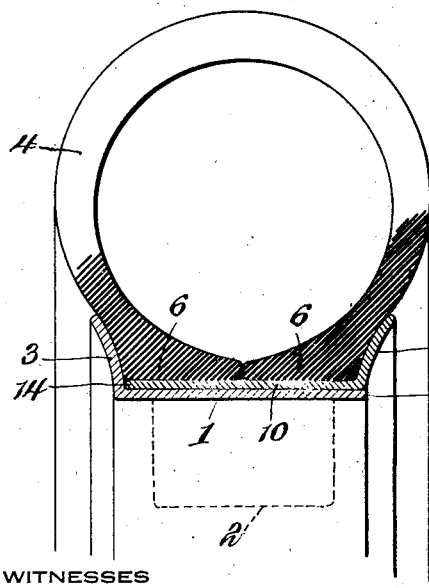
Figure 2 is a transverse section through the same on the line 2—2 of Figure 1 and drawn on a larger scale.
Figure 3:
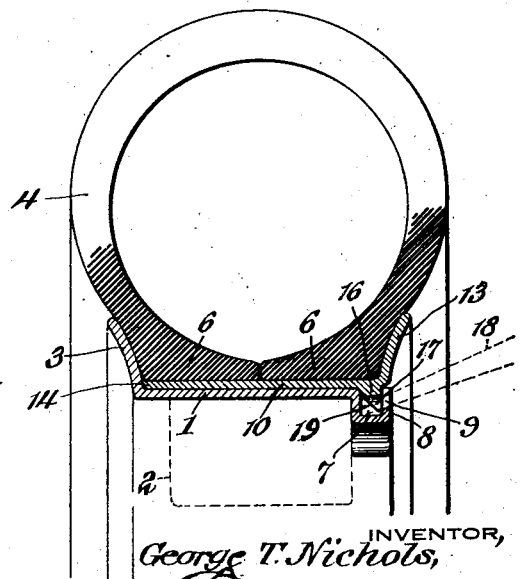
Figure 3 is a similar view taken on the line 3—3 of Figure 1.

Referring to the drawings, there is illustrated a base ring 1, which is adapted to be secured to the felly 2 of an automobile wheel in the usual manner, the width of the base ring being somewhat greater than the felly and overhanging the side faces of the same. The base ring is composed of suitable metal, and is of a uniform thickness throughout its circumference, one side edge of the same being turned outwardly to form the usual upstanding or outstanding and slightly curved flange 3, for engaging one side of the automobile tire 4, as shown in Figures 2 and 3 of the drawings.

The opposite edge 5 of the base ring is unflanged, and over this free edge the tire 4 is adapted to be placed, the inner, flat faces of the tire beads 6 being in slightly spaced relation to the outer face of the base ring, when the parts are thus assembled.

Adjacent to the unflanged edge 5 of the base ring there is provided a series of equally spaced seats 7 in the outer face thereof, said seats being in the form of alined, elongated grooves or sockets, preferably formed by pressing in the metal of the ring to provide surrounding walls to the said seats, the outer wall 8 of the same being flush with the edge 5, as clearly shown in Figure 4 of the drawings. The grooves extend inwardly from the inner face of the base ring and abut the side of the felly (Fig. 3). The depressed seats or grooves 7 extend parallel to the edge 5, and are preferably six in number, the outer wall 8 being provided with a central recess or opening 9 for the admission of the end of a screw driver or other tool, as indicated in dotted lines in Figures 6 and 7, for a purpose to be explained, and the base ring is further provided with an opening 1ª through which the valve stem 12 of the inner tube of the tire is adapted to be passed.

Interposed between the outer face of the base ring 1 and the inner faces of the beads 6 of the tire, is placed a locking ring 10, formed exactly like the base ring, and having an internal diameter to freely slide over the said base ring, the said locking ring being diagonally severed at 11 to permit of the necessary expansion and contraction of the same in placing it in position.

The locking ring is provided around one edge with an upstanding or outstanding tire engaging flange 13 formed exactly like the aforesaid flange 3 of the base ring, the other or inner edge 14 of the locking ring being unflanged, and adjacent to the split 11, the locking ring is provided with an open-ended slot 15 extending in from the edge 14 to a point adjacent to the flanged edge, the slot accommodating the valve stem 12 as the locking ring is placed in between the base ring and the tire.

A series of elongated inwardly-extending lugs 16 is carried by the locking ring, being formed integrally with or suitably secured to the inner face of said ring, and arranged parallel to and close to the flange 13 thereof, the said lugs being of the same number as the aforesaid seats 7, and spaced apart so as to enter into said seats, by properly positioning the locking ring over the base ring with the valve stem slot in proper position to receive the said stem.

Figure 1:
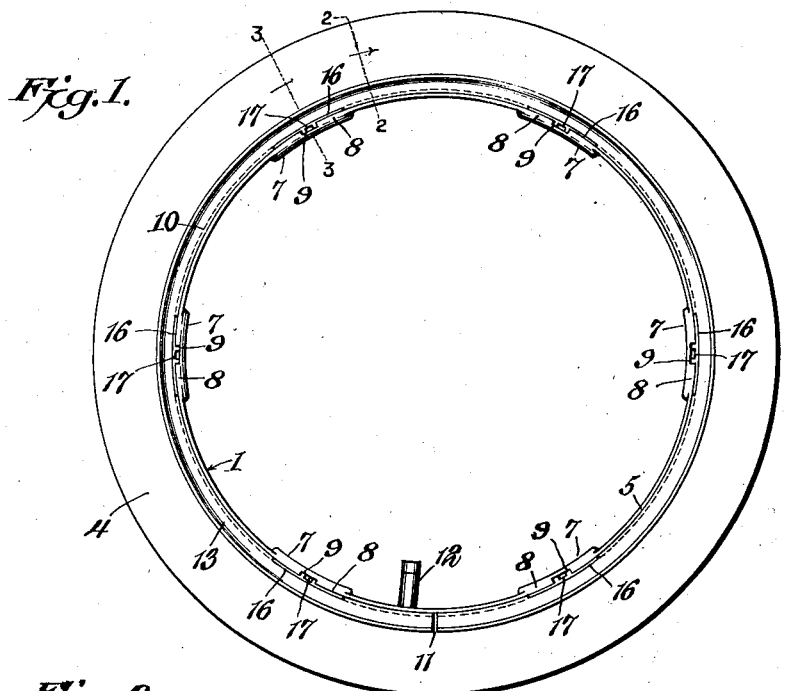
Figure 1 is a side elevation of a wheel rim constructed in accordance with the present invention, a tire being shown in connection therewith, but the wheel being omitted.

The spaced lugs 16 of the locking ring are provided each with a central depression or recess 17, somewhat smaller than the recesses 9 of the seats in the base ring, and adapted, when the lugs are seated into the said seats, to be fully exposed, as shown in Figures 1 and 7, for the reception of a screw driver or other tool 18, and the inner faces 19 of the lugs are each bevelled, as seen in Figures 3 and 6 of the drawings. As Figure 7 shows, the length of each lug is shorter than the seats or sockets.

With the base ring 1 properly secured to the periphery of the wheel felly 2, and the tire 4 having the usual inner tube (not shown) located therein, placed over the said base ring, the space between the tire beads 6 and the base ring affords ample room for the introduction of the locking ring, as the inner tube has not yet been given any material inflation. By alining the slot 15 with the valve stem 12, the locking ring is positioned properly to aline the lugs 16 thereon with the seats 7 of the base ring, and the said locking ring may now be forced inwardly over the latter. By first introducing the tool 18 between the registering recesses 9 and 17 of the first lug and seat adjacent to the split 11 (as shown in Figure 7), the locking ring may be pried outwardly to lift the lug above the outer wall 8 of its respective seat, the bevelled edge 19 facilitating such movement of the locking ring, and the latter may then be released by the tool 18 and the same will spring into the seat, after having slightly displaced the adjacent portion of the tire beads 6 to permit of such prying action. The same operation is then performed at the next adjacent lug and seat, and so on around the ring until all of the locking members are engaged, and the locking ring is seated on the base ring, with its free edge 14 abutting the inner face of the upstanding flange 3 and the flange 13 abutting against the adjacent outer wall of the tire. When the tire is fully inflated, the pressure thereof holds the several lugs firmly in their respective seats, and it is impossible for the locking ring to become disengaged from the base ring. Even in the event of a puncture, the same holds true, as the upward pressure on the collapsed tire is evenly distributed across the locking ring and its bearing on the base ring, and this also serves to hold the lugs in their seats. It is only by the aid of the tool 18 that the locking ring may be detached from the base ring when desired, by a reverse operation, that is, by prying the lug above its seat adjacent to the split in the ring, and forcing the end of the same outwardly in front of the wall 8 of the seat, when the bevelled edge 19 will aid in such forward movement, as the locking ring contracts upon removal of pressure on the tool. The next adjacent lug may then be released, and so on around the ring, when the locking ring may be freely removed from around the base ring with the tire remaining thereon. In the event that the tire is stuck tight to the locking ring, as often happens where the tire comes in firm contact with the rim, it is a comparative easy matter to remove the tire from the ring by prying the locking ring forwardly, causing the tire to ride forwardly on the locking ring, which solves the problem of removing a stuck tire from the rim.

Among the advantages of this invention may be stated the following: Because of the number and the length of the holding lugs and sockets forming the fastening means between the two rings, there is a greater amount of holding and bearing surface which insures the rigid connection of the parts without any tendency to creep.

Moreover, the fastening means is formed directly in the two rings from the material of which the rings is made and by the same stamping operation. There are no loose or hinged parts in the fastening means, and there is nothing to lose or to be taken care of when the two rings are disassociated.

When the two rings are assembled the beads constituting the base of the tire rest firmly and squarely on the locking ring so that when the locking ring is removed the tire comes off with it, or reversely speaking, when the tire is removed the locking ring is carried thereby, after which the tire and locking ring may be separated.

From the foregoing it will be seen that a simple, cheaply manufactured, and easily operated automobile wheel rim has been provided, which may have its component parts connected together in the normal manner and shipped without danger of losing any of the parts, while at the same time occupying a minimum amount of space in the carrier, and that the same may be formed by few mechanical operations, and easily and quickly operated to mount or demount a tire.

What is claimed is:—

1. A wheel rim comprising a complete base ring having one edge flanged continuously to form one of the flanges for the tire, and a locking ring section overlying the base ring for its full width and also having a flange at one edge, that edge of the base ring opposite the continuously flanged edge being provided with a plurality of sockets which extend inwardly from the base ring and are open at the outer face of the base ring but are closed at their ends, and the locking ring section having at the flanged edge a corresponding number of inwardly extending lugs depending from the inner face of the ring section to engage in the sockets.

2. A wheel rim comprising a base ring, and a split locking ring surrounding the base ring and supporting the beads of a tire, a continuous flange carried by the base ring and engaging one side of the tire, and a similar flange carried by the locking ring engaging the other side of the tire, the said base ring having a circumferential series of spaced elongated seats formed therein by pressing inwardly the metal thereof so that the seats depend from the inner face of the base ring, said seats extending longitudinally of the base ring and adjacent to the edge opposite to the flange thereon with their ends closed and their outer faces open, and inwardly directed lugs formed with the locking ring at the flanged edge thereof and depending from the inner face of the locking ring, said lugs resting within the seats to hold the rings together with the flanges against opposite sides of the tire, and said lugs having their inner faces beveled.

3. A wheel rim comprising a one-piece base ring and a split locking ring, each equal in width to the width of the base of a tire, the said locking ring being of an internal diameter to fit over the base ring, a continuous tire-retaining flange formed around one edge of each of the rings and adapted to bear against opposite sides of the tire, a series of elongated grooves formed in the base ring adjacent to the unflanged edge thereof, and having a central recess in the outer wall thereof, and a series of inwardly directed elongated lugs carried by the locking ring and adapted, when locked, to be seated in the grooves, said lugs having central recesses to coact with the recesses in the grooves to admit a tool for prying off the locking ring.

4. A wheel rim comprising a base ring adapted to be secured to the felly of a wheel and having a circumferential flange around one edge, and provided with a series of inwardly extending grooves adjacent to the unflanged edge thereof, the outer walls of the grooves each having a central recess, a split locking ring adapted to be sprung over the base ring and to bear around the same, a circumferential flange extending around the other edge of the locking ring opposite the flange of the base ring, and adapted therewith to engage the sides of the tire, and a series of lugs extending inwardly from the flanged edge of the locking ring and adapted to be seated in the grooves, said lugs having their inner faces bevelled to facilitate their seating and unseating and provided each with a central recess for coaction with the recess in each groove for the introduction of a prying tool.

In testimony that I claim the foregoing as my own, I have hereto affixed my signature.

GEO. THOMAS NICHOLS.